(12) United States Patent      (10) Patent No.: US 9,312,069 B2
Nishimura et al.      (45) Date of Patent: Apr. 12, 2016

(54) LAMINATED CERAMIC CAPACITOR AND MANUFACTURING METHOD THEREFOR

(71) Applicant: MURATA MANUFACTURING CO., LTD., Nagaokakyo-shi, Kyoto-Fu (JP)

(72) Inventors: Hitoshi Nishimura, Nagaokakyo (JP); Masahiro Naito, Nagaokakyo (JP); Tomotaka Hirata, Nagaokakyo (JP); Shinya Isota, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/614,465

(22) Filed: Feb. 5, 2015

(65) Prior Publication Data

US 2015/0155099 A1     Jun. 4, 2015

Related U.S. Application Data

(63) Continuation of application No. PCT/JP2013/062558, filed on Apr. 30, 2013.

(30) Foreign Application Priority Data

Aug. 9, 2012    (JP) .................................. 2012-176863

(51) Int. Cl.
     *H01G 4/10*         (2006.01)
     *H01G 4/12*         (2006.01)
     (Continued)

(52) U.S. Cl.
CPC ................ *H01G 4/012* (2013.01); *B32B 18/00* (2013.01); *C01G 25/006* (2013.01); *C04B 35/49* (2013.01); *C04B 35/62675* (2013.01); *C04B 35/62685* (2013.01); *H01G 4/1227* (2013.01); *H01G 4/1245* (2013.01); *H01G 4/30* (2013.01); *C01P 2002/34* (2013.01); *C04B 2235/3208* (2013.01); *C04B 2235/3213* (2013.01); *C04B 2235/3215* (2013.01); *C04B 2235/3217* (2013.01); *C04B 2235/3239* (2013.01); *C04B 2235/3262* (2013.01); *C04B 2235/3418* (2013.01);
(Continued)

(58) Field of Classification Search
CPC .. C04B 35/49; C04B 35/468; C04B 35/4682; H01G 4/1245
See application file for complete search history.

(56) References Cited

U.S. PATENT DOCUMENTS

2002/0016246 A1    2/2002   Kim et al.
2009/0246541 A1   10/2009   Nonaka et al.

FOREIGN PATENT DOCUMENTS

JP      2001-278664 A    10/2001
JP      2001-294481 A    10/2001
(Continued)

OTHER PUBLICATIONS

Machine translation of JP 2001294481, Jan. 2001.*
(Continued)

*Primary Examiner* — Karl Group
(74) *Attorney, Agent, or Firm* — Arent Fox LLP (57) ABSTRACT

A laminated body that contains a perovskite-type compound containing Sr, Ba, Zr, and Ti and containing; Si; Mn; Al; and V. When the total content of Zr and Ti is 100 parts by mol, the total content m of Sr and Ba meets $100 \leq m \leq 105$, the Si content a meets $0.1 \leq a \leq 4.0$, the Mn content b meets $0.1 \leq b \leq 4.0$, the Al content c meets $0.01 \leq c \leq 3.0$, the V content d meets $0.01 \leq d \leq 0.3$, the molar ratio w of Sr and Ba to Sr meets $0.60 \leq w \leq 0.95$, the molar ratio z of the total of Zr and Ti to Zr meets $0.92 \leq z \leq 0.98$, w and y meets and the crystal grains are 1.2 μm or less in average grain size.

20 Claims, 4 Drawing Sheets

(51) Int. Cl.
*C04B 35/468* (2006.01)
*C04B 35/47* (2006.01)
*H01G 4/012* (2006.01)
*H01G 4/30* (2006.01)
*B32B 18/00* (2006.01)
*C01G 25/00* (2006.01)
*C04B 35/49* (2006.01)
*C04B 35/626* (2006.01)

(52) U.S. Cl.
CPC ... *C04B2235/6584* (2013.01); *C04B 2235/785* (2013.01); *C04B 2235/786* (2013.01); *C04B 2235/79* (2013.01); *C04B 2237/346* (2013.01); *C04B 2237/348* (2013.01); *C04B 2237/704* (2013.01)

(56) References Cited

FOREIGN PATENT DOCUMENTS

| | | |
|---|---|---|
| JP | 2003-063867 A | 3/2003 |
| JP | 2007-055835 A | 3/2007 |
| JP | 2009-263209 A | 11/2009 |

OTHER PUBLICATIONS

PCT/JP2013/062558 Written Opinion dated May 21, 2013.
PCT/JP2013/062558 ISR dated May 21, 2013.

* cited by examiner

LAMINATED CERAMIC CAPACITOR AND MANUFACTURING METHOD THEREFOR

CROSS REFERENCE TO RELATED APPLICATIONS

The present application is a continuation of International application No. PCT/JP2013/062558, filed Apr. 30, 2013, which claims priority to Japanese Patent Application No. 2012-176863, filed Aug. 9, 2012, the entire contents of each of which are incorporated herein by reference.

FIELD OF THE INVENTION

The present invention relates to a laminated ceramic capacitor and a manufacturing method therefore, and more particularly, relates to a laminated ceramic capacitor including: a laminated body including a plurality of dielectric ceramic layers stacked and a plurality of internal electrodes provided at a plurality of interfaces between the dielectric ceramic layers; and an external electrode formed on the outer surface of the laminated body and electrically connected to the internal electrodes, and a manufacturing method therefore.

BACKGROUND OF THE INVENTION

Figure 2:
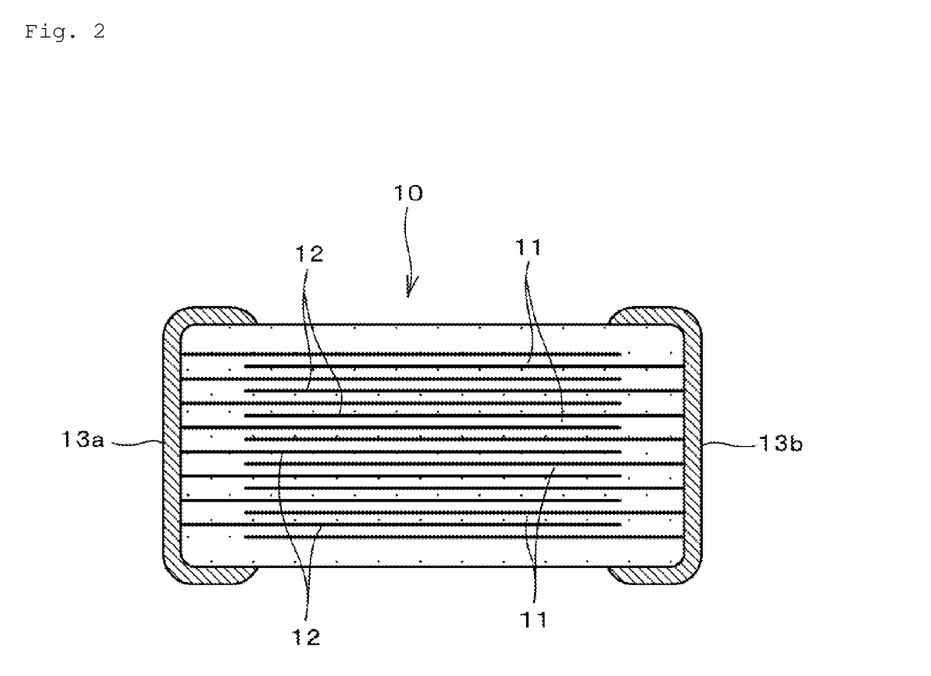
FIG. 2 is a front cross-sectional view of the laminated ceramic capacitor according to an embodiment of the present invention.

In recent years, with the reduction in size and weight for electronic devices, laminated ceramic capacitors have been used widely which are small in size and capable of acquiring high capacitance. These laminated ceramic capacitors have, for example, as shown in FIG. 2, a structure including: a laminated body 10 including a plurality of dielectric ceramic layers 11 stacked, and a plurality of internal electrodes 12 provided at a plurality of interfaces between the dielectric ceramic layers 11; and a pair of external electrodes 13a, 13b provided on both end surfaces of the laminated body 10 so as to be brought into electrical continuity with the internal electrodes 12 alternately exposed at the opposite end surfaces.

Furthermore, in these laminated ceramic capacitors, dielectric ceramic materials which have a high dielectric constant and contain, as their main constituent, a perovskite-type compound containing Ba, Ti, etc. have been used widely as the material constituting the dielectric ceramic layers.

Furthermore, dielectric ceramic compositions as described in Patent Document 1 have been proposed as such dielectric ceramic materials.

This dielectric ceramic composition contains, as its main constituent, a composition represented by a general formula: $n(BaO_x\text{—}SrO_y\text{—}CaO_z)(Zr_mTi_{1-m})O_2$ (where x+y+z=1, x, y, z, m, and n represent molar ratios) in which x, y, and z are, in terms of molar ratio, in the composition ranges shown in Table 1 of Patent Document 1 where a, b, c, d, and e are surrounded by straight lines, and m and n are in the ranges of $m \geq 0.95$ and $0.8 \geq n \geq 1.04$, and contains as additives, 0.1 to 0.7 wt % of $Mn_3O_4$, 0.5 to 3.0 wt % of $BaSiO_3$, 0.01 to 0.07 wt % of $V_2O_5$, and further 0.05 to 0.30 wt % of $Al_2O_3$ added with respect to 100 wt % of the main constituent.

However, in the case of the conventional dielectric ceramic composition mentioned above, because grain growth of crystal grains by firing is likely to be promoted rapidly, there is a problem that in particular, in such a thin-layer region having a thickness of the dielectric ceramic layer (the thickness of a dielectric ceramic layer sandwiched between internal electrodes for the formation of capacitance) of 3 μm or less, the grain sizes (grain sizes) of crystal grains with respect to the thickness of the dielectric ceramic layer are excessively increased to not only increase the initial short circuit ratio, but also increase the time degradation in insulation resistance in a high-temperature load test, thereby shortening the high-temperature load life.

Patent Document 1: Japanese Patent Application Laid-Open No. 2001-294481

SUMMARY OF THE INVENTION

The present invention is intended to solve the problem mentioned above, and an object of the present invention is to provide a highly reliable laminated ceramic capacitor which undergoes a small change in insulation resistance with time in a high-temperature load test, and has excellent resistance to insulation degradation.

In order to solve the problem mentioned above, a laminated ceramic capacitor according to the present invention is:

a laminated ceramic capacitor including:

a laminated body including a plurality of dielectric ceramic layers stacked, and a plurality of internal electrodes provided at more than one interface of the interfaces between the dielectric ceramic layers; and an external electrode formed on the outer surface of the laminated body and electrically connected to the internal electrodes, and characterized in that:

the laminated body contains:

Si, Mn, Al, V and a perovskite-type compound containing Sr, Ba, Zr, Ti, and optionally containing Ca;

when the total content of Zr and Ti is regarded as 100 parts by mol, (a) the total content m (parts by mol) of Sr, Ba, and Ca meets $100 \leq m \leq 105$;

(b) the Si content a (parts by mol) meets $0.1 \leq a \leq 4.0$;

(c) the Mn content b (parts by mol) meets $0.1 \leq b \leq 4.0$;

(d) the Al content c (parts by mol) meets $0.01 \leq c \leq 3.0$;

(e) the V content d (parts by mol) meets $0.01 \leq d \leq 0.3$;

(f) the molar ratio w (Sr/(Sr+Ba+Ca)) of the total of Sr, Ba, and Ca to Sr meets $0.60 \leq w \leq 0.95$;

(g) the molar ratio y (Ca/(Sr+Ba+Ca)) of the total of Sr, Ba, and Ca to Ca meets $0 \leq y \leq 0.35$;

(h) the molar ratio z (Zr/(Zr+Ti)) of the total of Zr and Ti to Zr meets $0.92 \leq z \leq 0.98$;

the total of the value of the w and the value of the y meets the relationship of $0.6 \leq w+y \leq 0.95$; and the plurality of dielectric ceramic layers each have crystal grains; and the crystal grains are 1.2 μm or less in average grain size.

It is to be noted that a dielectric ceramic composition in a composition range containing a lot of Sr and Ba (in particular, Sr) at the A site of the perovskite-type compound represented by the general formula $ABO_3$ as mentioned above, with a low Ca content or without any Ca contained, is used as the dielectric ceramic constituting the laminated ceramic capacitor, the sintered dielectric ceramic layers are likely to undergo an increase in linear expansion coefficient, and brought closer to the linear expansion coefficient of the internal electrodes, and there is thus a tendency to suppress internal stress, and improve, in particular, the moisture-resistance load life (insulation degradation life in a moisture-resistance load test), for example, when the composition is applied to a laminated ceramic capacitor including Ni internal electrodes.

Furthermore, the laminated ceramic capacitor according to the present invention is:

a laminated ceramic capacitor including:

a laminated body including a plurality of dielectric ceramic layers stacked, and a plurality of internal electrodes provided at more than one interface of the interfaces between the dielectric ceramic layers; and an external electrode formed on the outer surface of the laminated body and electrically connected to the internal electrodes, and characterized in that:

the laminated body contains:

Si, Mn, Al, V and a perovskite-type compound containing Sr, Ba, Zr, Ti, and optionally containing Ca, when the total content of Zr and Ti is regarded as 100 parts by mol in a case of the laminated body subjected to dissolution treatment to be made into a solution, (a) the total content m (parts by mol) of Sr, Ba, and Ca meets $100 \leq m \leq 105$;

(b) the Si content a (parts by mol) meets $0.1 \leq a \leq 4.0$;

(c) the Mn content b (parts by mol) meets $0.1 \leq b \leq 4.0$;

(d) the Al content c (parts by mol) meets $0.01 \leq c \leq 3.0$;

(e) the V content d (parts by mol) meets $0.01 \leq d \leq 0.3$;

(f) the molar ratio w (Sr/(Sr+Ba+Ca)) of the total of Sr, Ba, and Ca to Sr meets $0.60 \leq w \leq 0.95$;

(g) the molar ratio y (Ca/(Sr+Ba+Ca)) of the total of Sr, Ba, and Ca to Ca meets $0 \leq y \leq 0.35$;

(h) the molar ratio z (Zr/(Zr+Ti)) of the total of Zr and Ti to Zr meets $0.92 \leq z \leq 0.98$;

the total of the value of the w and the value of the y meets the relationship of $0.6 \leq w+y \leq 0.95$; and the plurality of dielectric ceramic layers each have crystal grains; and the crystal grains are 1.2 μm or less in average grain size.

It is to be noted that the phrase "the case of the laminated body subjected to dissolution treatment to be made into a solution" in the present invention refers to a concept that means a case of the laminated body dissolved with an acid to be made into a solution, a case of the laminated body subjected to alkali fusion, and then dissolved in an acid to be made into a solution, etc., and the method for subjecting the laminated body to the dissolution treatment to be made into a solution is not specially restricted.

Furthermore, a laminated ceramic capacitor according to the present invention is:

a laminated ceramic capacitor including:

a laminated body including a plurality of dielectric ceramic layers stacked, and a plurality of internal electrodes provided at more than one interface of the interfaces between the dielectric ceramic layers; and an external electrode formed on the outer surface of the laminated body and electrically connected to the internal electrodes, and characterized in that:

the dielectric ceramic layers contain:

Si, Mn, Al, V and a perovskite-type compound containing Sr, Ba, Zr, Ti, and optionally containing Ca, when the total content of Zr and Ti is regarded as 100 parts by mol, (a) the total content m (parts by mol) of Sr, Ba, and Ca meets $100 \leq m \leq 105$;

(b) the Si content a (parts by mol) meets $0.1 \leq a \leq 4.0$;

(c) the Mn content b (parts by mol) meets $0.1 \leq b \leq 4.0$;

(d) the Al content c (parts by mol) meets $0.01 \leq c \leq 3.0$;

(e) the V content d (parts by mol) meets $0.01 \leq d \leq 0.3$;

(f) the molar ratio w (Sr/(Sr+Ba+Ca)) of the total of Sr, Ba, and Ca to Sr meets $0.60 \leq w \leq 0.95$;

(g) the molar ratio y (Ca/(Sr+Ba+Ca)) of the total of Sr, Ba, and Ca to Ca meets $0 \leq y \leq 0.35$;

(h) the molar ratio z (Zr/(Zr+Ti)) of the total of Zr and Ti to Zr meets $0.92 \leq z \leq 0.98$;

the total of the value of the w and the value of the y meets the relationship of $0.6 \leq w+y \leq 0.95$; and the plurality of dielectric ceramic layers each have crystal grains; and the crystal grains are 1.2 μm or less in average grain size.

In the laminated ceramic capacitor according to the present invention, the crystal grains are preferably 1.0 μm or less in average grain size.

The crystal grains adjusted to 1.0 μm or less in average grain size can provide a laminated ceramic capacitor which further has a low initial short circuit ratio, and excellent insulation degradation life and moisture-resistance load life.

Furthermore, the internal electrodes preferably contain Ni or a Ni alloy.

The use of, as the internal electrodes, internal electrodes containing Ni or a Ni alloy makes it possible to provide a highly reliable laminated ceramic capacitor while reducing the material cost.

Furthermore, a method for manufacturing a laminated ceramic capacitor according to the present invention is characterized in that it includes the steps of:

(1) preparing ceramic slurry by mixing a powder including a Si compound, a Mn compound, an Al compound, a V compound, and a perovskite-type compound containing Sr, Ba, Zr, Ti and optionally containing Ca, and making the mixture into slurry, where in the ceramic slurry, when the total content of Zr and Ti is regarded as 100 parts by mol, a) the total content m (parts by mol) of Sr, Ba, and Ca meets the requirement of $100 \leq m \leq 105$, b) the Si content a (parts by mol) meets the requirement of $0.1 \leq a \leq 4.0$, c) the Mn content b (parts by mol) meets the requirement of $0.1 \leq b \leq 4.0$, d) the Al content c (parts by mol) meets the requirement of $0.01 \leq c \leq 3.0$, e) the V content d (parts by mol) meets the requirement of $0.01 \leq d \leq 0.3$, f) the molar ratio w (Sr/(Sr+Ba+Ca)) of the total of Sr, Ba, and Ca to Sr meets the requirement of $0.60 \leq w \leq 0.95$, g) the molar ratio y (Ca/(Sr+Ba+Ca)) of the total of Sr, Ba, and Ca to Ca meets the requirement of $0 \leq y \leq 0.35$, h) the molar ratio z (Zr/(Zr+Ti)) of the total of Zr and Ti to Zr meets the requirement of $0.92 \leq z \leq 0.98$, and the total of the value of the w and the value of the y meets the requirement of $0.6 \leq w+y \leq 0.95$;

(2) forming the ceramic slurry into a sheet shape to obtain ceramic green sheets;

(3) forming an unfired laminated body obtained by stacking the ceramic green sheets and conductor patterns to serve as internal electrodes after being subjected to firing; and (4) firing the unfired laminated body to obtain a laminated body that has a structure with internal electrodes provided at more than one interface of the interfaces between the plurality of dielectric ceramic layers stacked, and has crystal grains of 1.2 μm or less in average grain size included in the dielectric ceramic layers.

Furthermore, a method for manufacturing a laminated ceramic capacitor according to the present invention is characterized in that it includes the steps of:

(1) preparing ceramic slurry by weighing and mixing a Si compound, a Mn compound, an Al compound, a V compound, and a powder including a perovskite-type compound containing Sr, Ba, Zr, Ti and optionally containing Ca, and making the mixture into slurry, where in the mixture, when the total content of Zr and Ti is regarded as 100 parts by mol, a) the total content m (parts by mol) of Sr, Ba, and Ca meets the requirement of $100 \leq m \leq 105$, b) the Si content a (parts by mol) meets the requirement of $0.1 \leq a \leq 4.0$, c) the Mn content b (parts by mol) meets the requirement of $0.1 \leq b \leq 4.0$, d) the Al content c (parts by mol) meets the requirement of $0.01 \leq c \leq 3.0$, e) the V content d (parts by mol) meets the requirement of $0.01 \leq d \leq 0.3$, f) the molar ratio w (Sr/(Sr+Ba+Ca)) of the total of Sr, Ba, and Ca to Sr meets the requirement of $0.60 \leq w \leq 0.95$, g) the molar ratio y (Ca/(Sr+Ba+Ca)) of the total of Sr, Ba, and Ca to Ca meets the requirement of $0 \leq y \leq 0.35$, h) the molar ratio z (Zr/(Zr+Ti)) of the total of Zr and Ti to Zr meets the requirement of $0.92 \leq z \leq 0.98$, and the total of the value of the w and the value of the y meets the requirement of $0.6 \leq w+y \leq 0.95$;

(2) forming the ceramic slurry into a sheet shape to obtain ceramic green sheets;

(3) forming an unfired laminated body obtained by stacking the ceramic green sheets and conductor patterns to serve as internal electrodes after being subjected to firing; and (4) firing the unfired laminated body to obtain a laminated body that has a structure with internal electrodes provided at more than one interface of the interfaces between the plurality of dielectric ceramic layers stacked, and has crystal grains of 1.2 µm or less in average grain size included in the dielectric ceramic layers.

Moreover, in the invention of the method for manufacturing a laminated ceramic capacitor according to the present invention, the powder is preferably a powder prepared by calcining and loosening a material containing a Sr compound, a Ba compound, a Ti compound, and a Zr compound, and a powder that has a (202) diffraction peak obtained by powder X-ray diffraction with an integral width of 0.4° or less.

The composition mentioned above makes it possible to reduce the average grain size for the crystal grains to 1.2 µm or less, and makes it possible to keep down the initial short circuit ratio, and to achieve excellent high-temperature load life and moisture-resistance load life, even when the thickness of the dielectric ceramic layer (the thickness of the dielectric ceramic layer sandwiched between the internal electrodes for the formation of capacitance) is adjusted down to 3.0 µm or less.

Furthermore, the integral width is more preferably 0.3° or less.

The integral width adjusted down to 0.3° or less makes it possible to reduce the average grain size for the crystal grains down to 1.0 µm or less, and makes it possible to keep down the initial short circuit ratio, and to achieve excellent high-temperature load life and moisture-resistance load life, even when the thickness of the dielectric ceramic layer (the thickness of the dielectric ceramic layer sandwiched between the internal electrodes for the formation of capacitance) is adjusted down to 1.5 µm or less.

In the laminated ceramic capacitor according to the present invention, the "laminated body" including the plurality of dielectric ceramic layers stacked and the plurality of internal electrodes provided at more than one interface of the interfaces between the dielectric ceramic layers contains:

Si, Mn, Al, V and the perovskite-type compound containing Sr, Ba, Zr, and Ti, and optionally containing Ca, and when the total content of Zr and Ti is regarded as 100 parts by mol, (a) the total content m (parts by mol) of Sr, Ba, and Ca meets the condition of $100 \leq m \leq 105$, (b) the Si content a (parts by mol) meets the condition of $0.1 \leq a \leq 4.0$, (c) the Mn content b (parts by mol) meets the condition of $0.1 \leq b \leq 4.0$, (d) the Al content c (parts by mol) meets the condition of $0.01 \leq c \leq 3.0$, (e) the V content d (parts by mol) meets the condition of $0.01 \leq d \leq 0.3$, (f) the molar ratio w (Sr/(Sr+Ba+Ca)) of the total of Sr, Ba, and Ca to Sr meets the condition of $0.60 \leq w \leq 0.95$, (g) the molar ratio y (Ca/(Sr+Ba+Ca)) of the total of Sr, Ba, and Ca to Ca meets the condition of $0 \leq y \leq 0.35$, (h) the molar ratio z (Zr/(Zr+Ti)) of the total of Zr and Ti to Zr meets the condition of $0.92 \leq z \leq 0.98$, the total of the value of the w and the value of the y meets condition of $0.6 \leq w+y \leq 0.95$, and the crystal grains are 1.2 µm or less in average grain size. Thus, a highly reliable laminated ceramic capacitor can be achieved which has a low initial short circuit ratio, and has excellent moisture-resistance load life and high-temperature load life.

More specifically, according to the present invention, even when the thickness of the dielectric ceramic layer is reduced even down to 3.0 µm or less, a laminated ceramic capacitor can be provided which allows the initial short circuit ratio to be kept down, and has excellent high-temperature load life and moisture-resistance load life.

Moreover, also when the "dielectric ceramic layers" constituting the laminated body are brought within the composition range mentioned above, and composed so as to meet the requirement of crystal grains of 1.2 µm or less in average grain size, a highly reliable laminated ceramic capacitor can be achieved which has a low initial short circuit ratio, and has excellent moisture-resistance load life and high-temperature load life.

In addition, the method for manufacturing a laminated ceramic capacitor according to the present invention is adapted to prepare the ceramic slurry that meets the composition requirements as mentioned above, form the unfired laminated body of stacked the ceramic green sheets obtained by shape forming of the ceramic slurry and conductor patterns to serve as internal electrodes after being subjected to firing, and then fire the unfired laminated body to obtain the laminated body that has a structure with internal electrodes provided between the dielectric ceramic layers, and has crystal grains of 1.2 µm or less in average grain size included in the dielectric ceramic layers, and thus laminated ceramic capacitors can be efficiently manufactured that meet the requirements of the present invention as mentioned above.

Alternatively, also in the case of meeting the predetermined composition requirements as mentioned above at the stage of a mixture (weighed material mixture) of weighed materials obtained by weighing the respective raw materials, preparing the ceramic slurry from the weighed material mixture, forming the unfired laminated body of stacked ceramic green sheets obtained by shape forming of the ceramic slurry and conductor patterns to serve as internal electrodes after being subjected to firing, and then firing the unfired laminated body to obtain the laminate body that has a structure with internal electrodes provided between the dielectric ceramic layers, and has crystal grains of 1.2 µm or less in average grain size included in the dielectric ceramic layers, a laminated ceramic capacitor can be efficiently manufactured which meets the above-mentioned requirements of the present invention.

DETAILED DESCRIPTION OF THE INVENTION

With reference to an embodiment of the present invention, features of the present invention will be described below in details.

<Preparation of Laminated Ceramic Capacitor>

For the preparation of a laminated ceramic capacitor, first, respective powders of $CaCO_3$, $SrCO_3$, $BaCO_3$, $TiO_2$, and $ZrO_2$ of 99 weight % or more in purity were prepared as materials constituting the dielectric ceramic layers.

Then, the respective powders (main constituent materials) mentioned above were weighed so that the total content of Sr, Ba, and Ca was m parts by mol with respect to 100 parts by mol of the total content of Zr and Ti, the molar ratio Sr/(Sr+Ba+Ca) of Sr to the total of Sr, Ba, and Ca was w, the molar ratio Ca/(Sr+Ba+Ca) of Ca to the total of Sr, Ba, and Ca was y, and the molar ratio Zr/(Zr+Ti) of Zr to the total of Zr and Ti was z, then mixed in a wet way with a ball mill, dried, and then loosened. Tables 1A and 1B show the values of m, w, y, z, and w+y in the respective samples.

This powder was subjected to calcination for 2 h at 1100 to 1300° C. to synthesize a perovskite-type compound containing Sr, Ba, Zr, and Ti, and optionally containing Ca, and then loosened to obtain a powder (main constituent powder) as a main constituent constituting dielectric ceramic layers. It is to be noted that the production method (synthesis method) for this powder (main constituent powder) is not particularly limited, but it is possible to use a solid-phase method, a hydrothermal method, and various other known methods. In addition, the materials are also not particularly limited, but it is possible to use various forms of carbonates, oxides, hydroxides, chlorides, etc. In addition, inevitable impurities such as $HfO_2$ may be contained.

Then, for this powder (main constituent powder), the integral width of a (202) diffraction peak was measured by XRD. It is to be noted that the integral width is a value obtained in such a way that the area surrounded by the curve representing the peak shape is divided by the height of the peak top. The measurement result of the integral width is shown together in Tables 1A and 1B.

It is to be noted that the average grain size for crystal grains in the dielectric ceramic layers constituting the laminated ceramic capacitor was controlled mainly by the integral width of the main constituent powder in this embodiment.

Next, respective powders of $SiO_2$, $MnCO_3$, $Al_2O_3$, and $V_2O_5$ were prepared as additive materials. These powders were weighed so that the Si content, Mn content, Al content, and V content were a parts by mol, b parts by mol, c parts by mol, and d parts by mol, respectively, with respect to 100 parts by mol of the total content of Zr and Ti in the main constituent powder, and blended with the main constituent powder to obtain a blended product. Then, this blended product was mixed in a wet way with a ball mill, then dried, and loosened into a dielectric raw material powder. Tables 1A and 1B show the values of a, b, c, and d in the respective samples.

It is to be noted that it is also possible to add materials such as $CaCO_3$, $SrCO_3$, $BaCO_3$, $TiO_2$, and $ZrO_2$ for the adjustment of the molar ratios at the stage of adding the additive materials.

In addition, zirconia may be mixed in some cases from materials other than the weighed materials, such as in the case of using YSZ (yttria stabilized zirconia) balls as media in the process of mixing in a wet way, and in such cases, the proportions of the materials blended are adjusted in consideration of the mixed amount so as to provide the compositions in Tables 1A and 1B.

Then, the dielectric raw material powder obtained in the way described above was, with the addition of a polyvinyl butyral-based binder and an organic solvent such as ethanol thereto, mixed in a wet way with a ball mill to prepare ceramic slurry.

The dielectric raw material powder in the ceramic slurry prepared was dissolved with an acid, and subjected to ICP atomic emission spectroscopy analysis to confirm that the powder had almost the same composition as the compositions shown in Tables 1A and 1B.

TABLE 1A

| Sample Number | w (Molar Ratio) | y (Molar Ratio) | w + y | z (Molar Ratio) | m (parts by mol) | a (parts by mol) | b (parts by mol) | c (parts by mol) | d (parts by mol) | Calcination Temperature (° C.) | Integral Width (°) | Average Grain Size (μm) Thickness of Dielectric Ceramic Layer of 3.0 μm | Average Grain Size (μm) Thickness of Dielectric Ceramic Layer of 1.5 μm |
|---|---|---|---|---|---|---|---|---|---|---|---|---|---|
| 1 | 0.75 | 0.05 | 0.80 | 0.96 | 102 | 1.00 | 1.00 | 0.80 | 0.10 | 1300 | 0.25 | 0.65 | 0.68 |
| 2 | 0.75 | 0.05 | 0.80 | 0.96 | 103 | 1.00 | 1.00 | 0.80 | 0.10 | 1250 | 0.28 | 0.80 | 0.83 |
| 3 | 0.75 | 0.05 | 0.80 | 0.96 | 102 | 1.00 | 1.00 | 0.80 | 0.10 | 1220 | 0.30 | 1.00 | 1.02 |
| 4 | 0.75 | 0.05 | 0.80 | 0.96 | 102 | 1.00 | 1.00 | 0.80 | 0.10 | 1200 | 0.34 | 1.05 | 1.07 |
| 5 | 0.75 | 0.05 | 0.80 | 0.96 | 102 | 1.00 | 1.00 | 0.80 | 0.10 | 1150 | 0.38 | 1.10 | 1.02 |
| 6 | 0.75 | 0.05 | 0.80 | 0.96 | 102 | 1.00 | 1.00 | 0.80 | 0.10 | 1120 | 0.40 | 1.20 | 1.20 |
| 7* | 0.75 | 0.05 | 0.80 | 0.96 | 102 | 1.00 | 1.00 | 0.80 | 0.10 | 1100 | 0.42 | 1.50 | 1.40 |
| 8 | 0.60 | 0.20 | 0.80 | 0.94 | 102 | 1.00 | 1.00 | 0.80 | 0.10 | 1300 | 0.25 | 0.65 | 0.72 |
| 9* | 0.97 | 0.00 | 0.97 | 0.96 | 103 | 0.50 | 1.00 | 0.40 | 0.20 | 1250 | 0.25 | 0.26 | 0.25 |
| 10 | 0.95 | 0.00 | 0.95 | 0.92 | 104 | 1.00 | 1.00 | 0.80 | 0.10 | 1300 | 0.26 | 0.68 | 0.62 |
| 11 | 0.60 | 0.00 | 0.60 | 0.96 | 103 | 1.00 | 1.00 | 0.80 | 0.10 | 1300 | 0.25 | 0.65 | 0.59 |
| 12* | 0.58 | 0.00 | 0.58 | 0.96 | 103 | 1.00 | 0.50 | 0.40 | 0.10 | 1250 | 0.26 | 0.30 | 0.31 |
| 13 | 0.60 | 0.35 | 0.95 | 0.98 | 102 | 1.00 | 1.00 | 0.80 | 0.10 | 1300 | 0.25 | 0.65 | 0.57 |
| 14 | 0.75 | 0.05 | 0.80 | 0.96 | 100 | 1.00 | 1.00 | 0.80 | 0.10 | 1250 | 0.28 | 0.96 | 0.91 |
| 15 | 0.75 | 0.05 | 0.80 | 0.96 | 103 | 1.00 | 1.00 | 0.80 | 0.10 | 1250 | 0.28 | 0.90 | 0.96 |
| 16 | 0.75 | 0.05 | 0.80 | 0.96 | 101 | 1.00 | 1.00 | 0.40 | 0.10 | 1250 | 0.28 | 0.83 | 0.78 |

TABLE 1A-continued

| Sample Number | w (Molar Ratio) | y (Molar Ratio) | w + y | z (Molar Ratio) | m (parts by mol) | a (parts by mol) | b (parts by mol) | c (parts by mol) | d (parts by mol) | Calcination Temperature (° C.) | Integral Width (°) | Average Grain Size (μm) Thickness of Dielectric Ceramic Layer of 3.0 μm | Average Grain Size (μm) Thickness of Dielectric Ceramic Layer of 1.5 μm |
|---|---|---|---|---|---|---|---|---|---|---|---|---|---|
| 17* | 0.58 | 0.37 | 0.95 | 0.96 | 105 | 1.00 | 1.00 | 0.40 | 0.10 | 1250 | 0.28 | 0.30 | 0.26 |
| 18* | 0.63 | 0.35 | 0.98 | 0.96 | 104 | 1.00 | 1.00 | 0.40 | 0.10 | 1250 | 0.30 | 0.29 | 0.33 |
| 19* | 0.80 | 0.10 | 0.90 | 0.90 | 104 | 0.80 | 0.80 | 0.60 | 0.10 | 1250 | 0.26 | 0.30 | 0.28 |
| 20* | 0.80 | 0.10 | 0.90 | 1.00 | 104 | 0.80 | 0.80 | 0.60 | 0.10 | 1250 | 0.26 | 0.26 | 0.25 |
| 21* | 0.60 | 0.35 | 0.95 | 0.96 | 107 | 0.20 | 0.20 | 0.80 | 0.10 | 1250 | 0.28 | 0.28 | 0.26 |
| 22* | 0.95 | 0.00 | 0.95 | 0.96 | 98 | 0.10 | 0.10 | 0.01 | 0.10 | 1250 | 0.25 | 0.26 | 0.23 |

TABLE 1B

| Sample Number | w (Molar Ratio) | y (Molar Ratio) | w + y | z (Molar Ratio) | m (parts by mol) | a (parts by mol) | b (parts by mol) | c (parts by mol) | d (parts by mol) | Calcination Temperature (° C.) | Integral Width (°) | Average Grain Size (μm) Thickness of Dielectric Ceramic Layer of 3.0 μm | Average Grain Size (μm) Thickness of Dielectric Ceramic Layer of 1.5 μm |
|---|---|---|---|---|---|---|---|---|---|---|---|---|---|
| 23* | 0.75 | 0.05 | 0.80 | 0.96 | 104 | 0.00 | 0.10 | 0.10 | 0.10 | 1250 | 0.28 | 0.25 | 0.26 |
| 24* | 0.75 | 0.05 | 0.80 | 0.96 | 104 | 0.10 | 0.00 | 0.10 | 0.10 | 1250 | 0.28 | 0.28 | 0.25 |
| 25 | 0.75 | 0.05 | 0.80 | 0.96 | 102 | 0.10 | 0.10 | 3.00 | 0.10 | 1250 | 0.28 | 0.80 | 0.86 |
| 26 | 0.75 | 0.05 | 0.80 | 0.96 | 102 | 0.30 | 0.30 | 1.50 | 0.10 | 1250 | 0.28 | 0.82 | 0.83 |
| 27 | 0.75 | 0.05 | 0.80 | 0.96 | 102 | 0.50 | 0.50 | 1.00 | 0.10 | 1250 | 0.28 | 0.72 | 0.76 |
| 28 | 0.75 | 0.05 | 0.80 | 0.96 | 102 | 0.80 | 0.80 | 0.80 | 0.10 | 1250 | 0.28 | 0.75 | 0.79 |
| 29* | 0.75 | 0.05 | 0.80 | 0.96 | 102 | 1.20 | 1.00 | 0.50 | 0.10 | 1100 | 0.42 | 1.60 | 1.51 |
| 30 | 0.75 | 0.05 | 0.80 | 0.96 | 102 | 1.50 | 1.20 | 0.20 | 0.10 | 1250 | 0.28 | 0.83 | 0.88 |
| 31 | 0.75 | 0.05 | 0.80 | 0.96 | 102 | 2.00 | 2.00 | 0.05 | 0.10 | 1250 | 0.28 | 0.79 | 0.75 |
| 32 | 0.75 | 0.05 | 0.80 | 0.96 | 102 | 4.00 | 4.00 | 0.01 | 0.10 | 1250 | 0.28 | 0.90 | 0.93 |
| 33* | 0.75 | 0.05 | 0.80 | 0.96 | 102 | 4.20 | 1.00 | 0.50 | 0.20 | 1250 | 0.28 | 1.00 | 1.02 |
| 34* | 0.75 | 0.05 | 0.80 | 0.96 | 102 | 1.20 | 4.20 | 0.50 | 0.20 | 1250 | 0.28 | 0.60 | 0.65 |
| 35* | 0.75 | 0.05 | 0.80 | 0.96 | 102 | 0.10 | 0.20 | 0.00 | 0.10 | 1250 | 0.28 | 0.28 | 0.27 |
| 36* | 0.75 | 0.05 | 0.80 | 0.96 | 102 | 4.00 | 4.00 | 3.20 | 0.10 | 1250 | 0.28 | 1.20 | 1.15 |
| 37* | 0.75 | 0.05 | 0.80 | 0.96 | 102 | 0.10 | 0.20 | 0.01 | 0.00 | 1250 | 0.28 | 0.28 | 0.26 |
| 38* | 0.75 | 0.05 | 0.80 | 0.96 | 102 | 1.50 | 2.00 | 0.60 | 0.32 | 1250 | 0.28 | 0.96 | 1.00 |
| 39 | 0.75 | 0.05 | 0.80 | 0.96 | 102 | 1.00 | 1.00 | 0.80 | 0.01 | 1250 | 0.28 | 0.78 | 0.73 |
| 40 | 0.75 | 0.05 | 0.80 | 0.96 | 102 | 1.00 | 1.00 | 0.80 | 0.05 | 1250 | 0.28 | 0.80 | 0.75 |
| 41 | 0.75 | 0.05 | 0.80 | 0.96 | 102 | 1.00 | 1.00 | 0.80 | 0.08 | 1250 | 0.28 | 0.80 | 0.83 |
| 42 | 0.75 | 0.05 | 0.80 | 0.96 | 102 | 1.00 | 0.40 | 0.80 | 0.14 | 1250 | 0.28 | 0.82 | 0.86 |
| 43 | 0.75 | 0.05 | 0.80 | 0.96 | 102 | 1.00 | 0.30 | 0.80 | 0.18 | 1250 | 0.28 | 0.76 | 0.78 |
| 44 | 0.75 | 0.05 | 0.80 | 0.96 | 102 | 1.00 | 0.10 | 0.80 | 0.30 | 1250 | 0.28 | 0.68 | 0.70 |

It is to be noted that in Tables 1A and 1B, the samples marked with * are samples that fail to meet the requirements of the present invention, whereas the other samples are samples that meet the requirements of the present invention.

Then, this ceramic slurry was subjected to sheet forming in accordance with a doctor blade method, and cut to obtain rectangular ceramic green sheets of 15 cm×15 cm in planar dimension. Next, a conductive paste containing Ni as a conductive component was printed onto the ceramic green sheets to form conductor patterns (internal electrode patterns) to serve as internal electrodes after being subjected to firing. It is to be noted that a paste containing 100 parts by weight of Ni powder as a metallic powder, 7 parts by weight of ethyl cellulose as an organic vehicle, and terpineol as a solvent was used as the conductive paste in this embodiment.

Then, a plurality of ceramic green sheets with the conductor patterns (internal electrode patterns) formed were stacked so that the conductor patterns were alternately extracted to the opposite sides, thereby providing an unfired laminated body. Then, this unfired laminated body was heated to 250° C. in the atmosphere to remove the binder.

Then, the laminated body subjected to the binder removal was subjected to firing under the conditions of rate of temperature increase: 3.33° C./min; maximum temperature: 1200 to 1300° C.; and oxygen partial pressure (log $PO_2$)=−10.0 MPa, to obtain a sintered laminated body.

Next, the sintered laminated body obtained was subjected to barrel polishing to expose the internal electrodes from end surfaces, and a Cu electrode paste for the formation of external electrodes was applied onto the end surfaces of the laminated body with the internal electrodes exposed, dried, and then baked at a maximum temperature of 800° C. in a reducing atmosphere to form external electrodes.

Thereafter, by barrel plating, Ni plated layers were formed on the surface of the external electrodes, and Sn plated layers were further formed on the Ni plated layers. Thus, the laminated ceramic capacitor (sample) was obtained as shown in the perspective view of FIG. 1 and the front cross-sectional view of FIG. 2.

Figure 1:
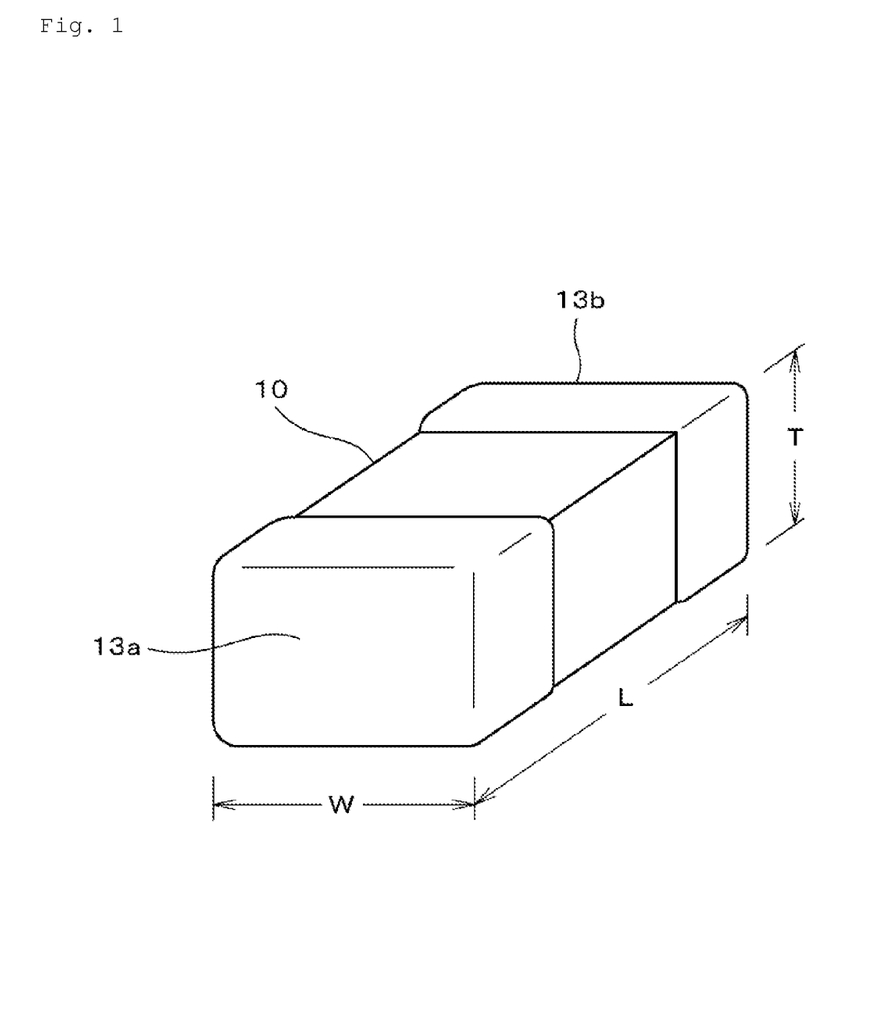
FIG. 1 is a perspective view of a laminated ceramic capacitor according to an embodiment of the present invention.

As shown in FIGS. 1 and 2, this laminated ceramic capacitor is structured to have the pair of external electrodes (Cu electrodes)) 13a, 13b provided so as to be brought into electrical continuity with the internal electrodes 12 alternately exposed at the opposite end surfaces, on the both end surfaces of the laminated body (laminated ceramic element) 10 including the plurality of dielectric ceramic layers 11 stacked, and the plurality of internal electrodes 12 provided at the plurality of interfaces between the dielectric ceramic layers 11.

It is to be noted that the dimensions of the laminated ceramic capacitor prepared in the way described above were 1.2 mm in width (W), 2.0 mm in length (L), and 0.6 mm in thickness (T), and the dielectric ceramic layer 11 interposed between the internal electrodes was 3.0 μm or 1.5 μm in thickness. In addition, the total number of effective dielectric ceramic layers was 80, excluding the outer layer section.

<In regard to Thickness of Dielectric Ceramic Layer>

(1) Preparation of Sample

Three pieces of samples were prepared for each of the samples (laminated ceramic capacitors) of sample numbers 1 to 44 prepared in the way described above.

(2) Observation of LT Cross Section

1) Polishing

Each sample was held in such a posture as the width (W) direction in a vertical direction, the sample was encased in resin, and the LT surface defined by the length (L) and thickness (T) of the sample was exposed from the resin.

Then, the LT surfaces of the respective samples were polished by a polishing machine, and polished to a depth on the order of ½ in the width (W) directions of the respective samples. Then, in order to eliminate shear drop of the internal electrodes, which is caused by the polishing, the polished surfaces were processed by ion milling after the completion of the polishing.

2) Measurement of Thickness of Dielectric Ceramic Layer

Figure 3:
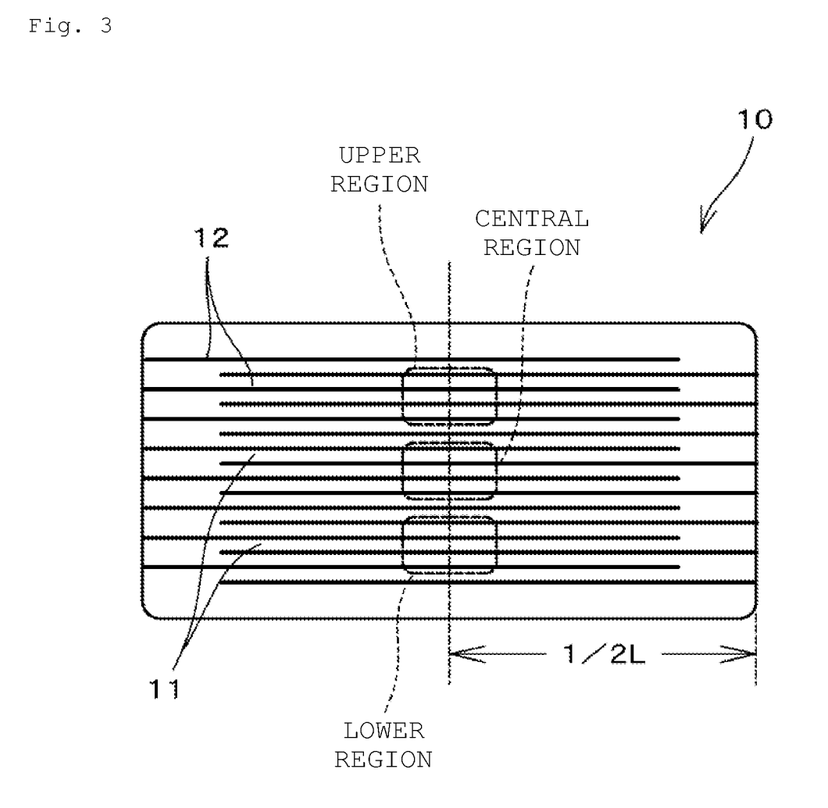
FIG. 3 is a diagram for explaining a method for measuring the thickness of dielectric ceramic layers of the laminated ceramic capacitor according to an embodiment of the present invention.

Then, as shown in FIG. 3, a line (orthogonal line) L orthogonal to the internal electrodes 12 was drawn in a position on the order of ½ of the LT cross section in the L direction. Next, a region of the sample with the internal electrodes 12 stacked was divided into three equal parts in the thickness (T) direction, i.e., three regions of: upper region; central region; and lower region. Then, excluding the outermost dielectric layers and two or more dielectric ceramic layers observed as being joined due to missing internal electrodes, the thicknesses for ten layers of the dielectric ceramic layers on the orthogonal line L were measured in a central portion for each region to obtain the average value (the number of data pieces: 10 layers×3 regions×3 (the number of samples)=90 pieces of data).

It is to be noted that the thickness for the dielectric ceramic layers was measured with the use of a scanning electron microscope.

<Confirmation of Composition of Laminated Body>

For each of the samples (laminated ceramic capacitors) prepared, the laminated body (ceramic sintered body) with the external electrodes removed therefrom was dissolved with an acid, and subjected to ICP atomic emission spectroscopy analysis. As a result, it has been confirmed that the body has almost the same composition as the compositions shown in Tables 1A and 1B, except for Ni as an internal electrode constituent.

<Characteristic Evaluation for Each Sample>

The following evaluations were made for each of samples (laminated ceramic capacitors) prepared in the way described above.

(1) Average Grain Size

Each sample (laminated ceramic capacitor) was fractured so as to expose the WT cross section at a depth on the order of ½ in the length (L) direction of the sample. Next, the sample was subjected to heat treatment in order to define the boundaries (grain boundaries) between crystal grains in the dielectric ceramic layers. The temperature for the heat treatment was adjusted to a temperature for keeping away from grain growth and defining the grain boundaries, and in this embodiment, the treatment was carried out at 1000° C.

Figure 4:
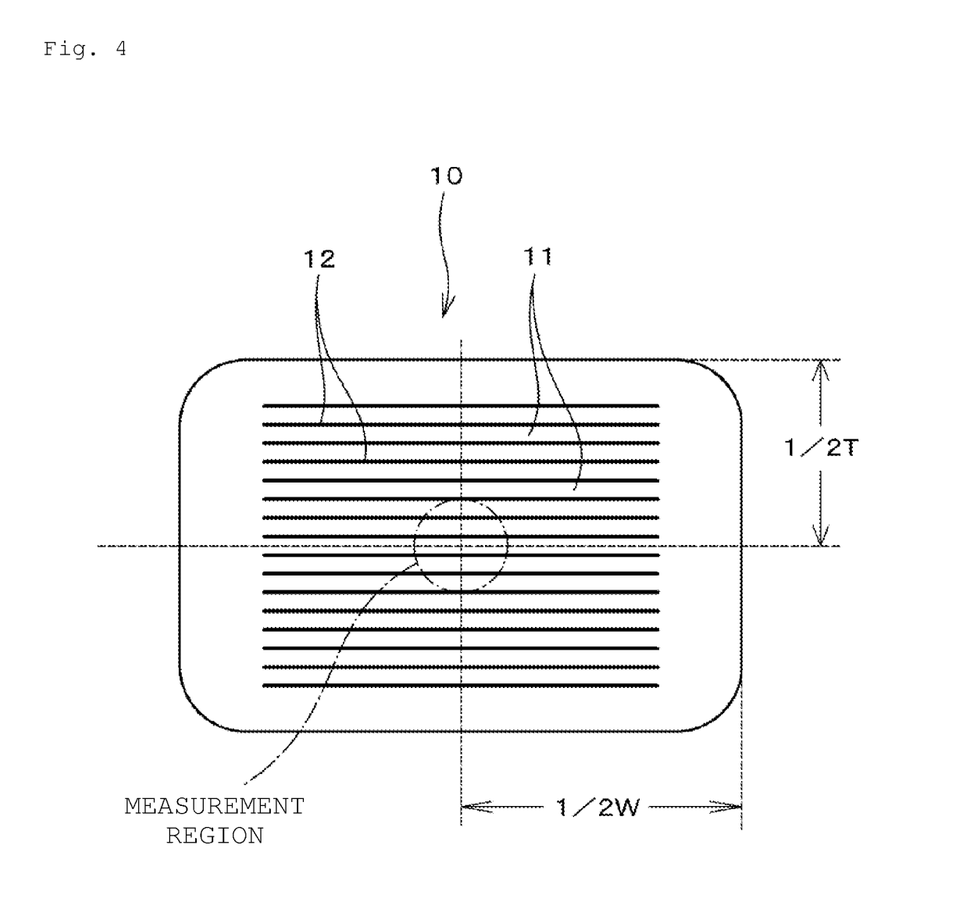
FIG. 4 is a diagram for explaining a method for measuring the average grain size for crystal grains per dielectric ceramic layer in the laminated ceramic capacitor according to an embodiment of the present invention.

Then, as shown in FIG. 4, a region near the position on the order of ½ in each of the W and T directions (that is, a substantially central region of the fracture section) at the fracture section (WT cross section) of the laminated body 10, which was fractured in the way described above, was observed as a measurement region (FIG. 4) at 10000-fold magnification with a scanning electron microscope (SEM).

Then, forty crystal grains were extracted in a random manner from the SEM image obtained, and subjected to image analysis to calculate the area of the portion inside the grain boundary for each crystal grain, and calculate the equivalent circle diameter, and the diameter was regarded as the grain size for each crystal grain. This grain size measurement for each crystal grain was made for three pieces of samples of respective conditions (the number of data pieces: 40 crystal grains×3 (the number of samples)=120 pieces of data).

Furthermore, assuming that the shape of each crystal grain was a sphere with, as a diameter, the grain size calculated in the way described above, the volume of each crystal grain was calculated as the volume of the sphere. Then, from the grain size and volume calculated in the way described above, the volume average grain sizes of the samples of respective conditions were calculated, and regarded as the average grain sizes of respective conditions. The thus obtained average grain sizes are shown together in Tables 1A and 1B.

(2) Initial Short Circuit Ratio

For each sample of sample numbers 1 to 44, 100 pieces (n=100) were checked on the initial short circuit ratio. In this case, the sample with the initial value of log IR down to 6 or less was counted as a defective short-circuited sample. The results are shown in Tables 2A and 2B.

(3) Accelerated Moisture-Resistance Load Test (PCBT)

Under the conditions of temperature: 120° C., humidity: 100% RH, atmospheric pressure: 0.122 MPa (1.2 atm), applied voltage: 50 V, the number of samples: 100 (samples without initial short circuit recognized), an accelerated moisture-resistance load test (PCBT) was carried out to count the number of samples with the value of log IR down to 6 or less after a lapse of 250 h. The results are shown together in Tables 2A and 2B.

(4) High-Temperature Load Life

Under the conditions of:

(a) 170° C. and 200 V (200/3 kV/mm in terms of electric field intensity) in the case of thickness of the dielectric ceramic layer (the thickness of the dielectric ceramic layer sandwiched between internal electrodes for the formation of capacitance) of 3.0 μm; and (b) 150° C. and 100 V (100/1.5 kV/mm in terms of electric field intensity) in the case of thickness of the dielectric ceramic layer of 1.5 μm, the measurement was made for n=100 (samples without initial short circuit recognized) to count the number of samples with IR below $10^6 \Omega$ after a lapse of 250 h. The results are shown together in Tables 2A and 2B.

It is to be noted that as for the samples with the initial short circuit ratio of 100/100 (the sample of sample number 9 with a thickness of the dielectric ceramic layer of 1.5 μm, the sample of sample number 22 with a thickness of the dielectric ceramic layer of 1.5 μm, the samples of sample number 38 with thicknesses of the dielectric ceramic layer of 3.0 μm and 1.5 μm) in Tables 2A and 2B, meaningful samples for the accelerated moisture-resistance load test and the high-temperature load life test, that is, samples without initial short circuit recognized are unable to be obtained, and thus have not been subjected to the accelerated moisture-resistance load test and the high-temperature load life test.

TABLE 2A

| Sample Number | Initial Short Circuit Thickness of Dielectric Ceramic Layer | | Moisture-Resistance Load Life Thickness of Dielectric Ceramic Layer | | High-Temperature Load Life Thickness of Dielectric Ceramic Layer | |
|---|---|---|---|---|---|---|
| | 3.0 μm | 1.5 μm | 3.0 μm | 1.5 μm | 3.0 μm | 1.5 μm |
| 1 | 0/100 | 0/100 | 0/100 | 0/100 | 0/100 | 0/100 |
| 2 | 0/100 | 0/100 | 0/100 | 0/100 | 0/100 | 0/100 |
| 3 | 0/100 | 0/100 | 0/100 | 0/100 | 0/100 | 0/100 |
| 4 | 0/100 | 1/100 | 0/100 | 0/100 | 0/100 | 7/100 |
| 5 | 0/100 | 2/100 | 0/100 | 0/100 | 0/100 | 12/100 |
| 6 | 0/100 | 3/100 | 0/100 | 0/100 | 0/100 | 13/100 |
| 7* | 3/100 | 90/100 | 22/100 | 100/100 | 46/100 | 98/100 |
| 8 | 0/100 | 0/100 | 0/100 | 0/100 | 0/100 | 0/100 |
| 9* | 90/100 | 100/100 | 100/100 | — | 100/100 | — |
| 10 | 0/100 | 0/100 | 0/100 | 0/100 | 0/100 | 0/100 |
| 11 | 0/100 | 0/100 | 0/100 | 0/100 | 0/100 | 0/100 |
| 12* | 93/100 | 88/100 | 100/100 | 100/100 | 100/100 | 100/100 |
| 13 | 0/100 | 0/100 | 0/100 | 0/100 | 0/100 | 0/100 |
| 14 | 1/100 | 2/100 | 0/100 | 2/100 | 1/100 | 2/100 |
| 15 | 0/100 | 0/100 | 0/100 | 0/100 | 0/100 | 0/100 |
| 16 | 0/100 | 0/100 | 0/100 | 0/100 | 0/100 | 0/100 |
| 17* | 80/100 | 85/100 | 100/100 | 100/100 | 100/100 | 100/100 |
| 18* | 90/100 | 90/100 | 100/100 | 100/100 | 100/100 | 100/100 |
| 19* | 83/100 | 88/100 | 100/100 | 100/100 | 100/100 | 100/100 |
| 20* | 95/100 | 96/100 | 100/100 | 100/100 | 100/100 | 100/100 |
| 21* | 93/100 | 90/100 | 100/100 | 100/100 | 100/100 | 100/100 |
| 22* | 96/100 | 100/100 | 100/100 | — | 100/100 | — |

TABLE 2B

| Sample Number | Initial Short Circuit Thickness of Dielectric Ceramic Layer | | Moisture-Resistance Load Life Thickness of Dielectric Ceramic Layer | | High-Temperature Load Life Thickness of Dielectric Ceramic Layer | |
|---|---|---|---|---|---|---|
| | 3.0 μm | 1.5 μm | 3.0 μm | 1.5 μm | 3.0 μm | 1.5 μm |
| 23* | 60/100 | 70/100 | 100/100 | 100/100 | 100/100 | 100/100 |
| 24* | 65/100 | 77/100 | 100/100 | 100/100 | 100/100 | 100/100 |
| 25 | 1/100 | 1/100 | 0/100 | 2/100 | 1/100 | 3/100 |
| 26 | 0/100 | 1/100 | 0/100 | 1/100 | 0/100 | 0/100 |
| 27 | 0/100 | 0/100 | 0/100 | 0/100 | 0/100 | 0/100 |
| 28 | 0/100 | 0/100 | 0/100 | 0/100 | 0/100 | 0/100 |
| 29* | 3/100 | 83/100 | 19/100 | 100/100 | 45/100 | 100/100 |
| 30 | 0/100 | 0/100 | 0/100 | 0/100 | 0/100 | 0/100 |
| 31 | 0/100 | 0/100 | 0/100 | 0/100 | 0/100 | 0/100 |
| 32 | 0/100 | 1/100 | 0/100 | 0/100 | 0/100 | 0/100 |
| 33* | 88/100 | 92/100 | 100/100 | 100/100 | 100/100 | 100/100 |
| 34* | 78/100 | 96/100 | 98/100 | 100/100 | 100/100 | 100/100 |
| 35* | 97/100 | 96/100 | 100/100 | 100/100 | 100/100 | 100/100 |
| 36* | 5/100 | 90/100 | 100/100 | 100/100 | 93/100 | 100/100 |
| 37* | 95/100 | 90/100 | 100/100 | 100/100 | 100/100 | 100/100 |
| 38* | 100/100 | 100/100 | — | — | — | — |
| 39 | 0/100 | 0/100 | 0/100 | 0/100 | 0/100 | 0/100 |
| 40 | 0/100 | 0/100 | 0/100 | 0/100 | 0/100 | 0/100 |
| 41 | 0/100 | 0/100 | 0/100 | 0/100 | 0/100 | 0/100 |
| 42 | 0/100 | 0/100 | 0/100 | 0/100 | 0/100 | 0/100 |
| 43 | 0/100 | 0/100 | 0/100 | 0/100 | 0/100 | 0/100 |
| 44 | 0/100 | 0/100 | 0/100 | 0/100 | 1/100 | 1/100 |

It is to be noted that in Tables 2A and 2B, the samples marked with * are samples that fail to meet the requirements of the present invention, whereas the other samples are samples that meet the requirements of the present invention.

As shown in Tables 2A and 2B, it has been confirmed that each of the samples that meet the requirements for the composition specified by the present invention, and meet the requirement (1.2 μm or less) for the average grain size among crystal grains has a low initial short circuit ratio in the case of the thickness of the dielectric ceramic layer of 3.0 μm, and provides a laminated ceramic capacitor which has favorable insulation degradation life and moisture-resistance load life.

In addition, it has been confirmed that the samples that meet the requirements for the composition specified by the present invention, and have an average grain size of 1.0 μm or less for crystal grains have a low initial short circuit ratio even in the case of the thickness of the dielectric ceramic layer adjusted to 1.5 μm, and provide laminated ceramic capacitors which have excellent insulation degradation life and moisture-resistance load life.

In contrast, it has been confirmed that the samples which fail to meet at least one of the requirements for the composition specified by the present invention and the requirement for the average grain size among crystal grains provide unfavorable results for at least any of initial short circuit, moisture-resistance load life, and high-temperature load life.

While the dielectric raw material powder in the ceramic slurry was dissolved with an acid, and subjected to ICP atomic emission spectroscopy analysis, or the laminated body (ceramic sintered body) after removing the external electrodes of the laminated ceramic capacitor (sample) was dissolved with an acid, and subjected to ICP atomic emission spectroscopy analysis in the embodiment described above, it is also possible to carry out a composition analysis for the dielectric ceramic layers constituting the laminated body.

It is to be noted that the present invention is not to be considered limited to the embodiment described above, but various applications and modifications can be made within the scope of the invention in regard to the numbers of the dielectric ceramic layers and internal electrodes constituting the laminated body, the composition of the dielectric ceramic layers, etc.

DESCRIPTION OF REFERENCE SYMBOLS

10 laminated body (laminated ceramic element)
11 dielectric ceramic layer
12 internal electrode
13a, 13b external electrode
L length
T thickness
W width

The invention claimed is:

1. A laminated ceramic capacitor comprising:
a laminated body comprising a plurality of stacked dielectric ceramic layers and a plurality of internal electrodes at interfaces between adjacent dielectric ceramic layers of the plurality of stacked dielectric ceramic layers; and
an external electrode on an outer surface of the laminated body and electrically connected to the plurality of internal electrodes,
wherein the laminated body contains:
Si, Mn, Al, V, and a perovskite-type compound containing Sr, Ba, Zr, and Ti,
when a total content of Zr and Ti is 100 parts by mol:
(a) a total content m (parts by mol) of Sr and Ba meets $100 \leq m \leq 105$,
(b) a Si content a (parts by mol) meets $0.1 \leq a \leq 4.0$,
(c) a Mn content b (parts by mol) meets $0.1 \leq b \leq 4.0$,
(d) an Al content c (parts by mol) meets $0.01 \leq c \leq 3.0$,
(e) a V content d (parts by mol) meets $0.01 \leq d \leq 0.3$,
(f) a molar ratio w of a total of Sr and Ba to Sr meets $0.60 \leq w \leq 0.95$,
(g) a molar ratio z (Zr/(Zr+Ti)) of a total of Zr and Ti to Zr meets $0.92 \leq z \leq 0.98$, and
the plurality of dielectric ceramic layers each have crystal grains, and the crystal grains are 1.2 μm or less in average grain size.

2. The laminated ceramic capacitor according to claim 1, wherein the perovskite-type compound also contains Ca, and when the total content of Zr and Ti is 100 parts by mol:
the total content of m includes Sr, Ba, and Ca,
the molar ratio w is the total of Sr, Ba, and Ca to Sr,
a molar ratio y is a total of Sr, Ba, and Ca to Ca meets $0 \leq y \leq 0.35$, and
a total of a value of the w and a value of the y meets $0.6 \leq w+y \leq 0.95$.

3. The laminated ceramic capacitor according to claim 1, wherein the crystal grains are 1.0 μm or less in average grain size.

4. The laminated ceramic capacitor according to claim 1, wherein the internal electrodes contain Ni or a Ni alloy.

5. A laminated ceramic capacitor comprising:
a laminated body comprising a plurality of stacked dielectric ceramic layers and a plurality of internal electrodes at interfaces between adjacent dielectric ceramic layers of the plurality of stacked dielectric ceramic layers; and
an external electrode on an outer surface of the laminated body and electrically connected to the internal electrodes,
wherein the laminated body contains:
Si, Mn, Al, V, and a perovskite-type compound containing Sr, Ba, Zr, and Ti,
when a total content of Zr and Ti is 100 parts by mol after the laminated body is subjected to dissolution treatment and made into a solution:
(a) a total content m (parts by mol) of Sr and Ba meets $100 \leq m \leq 105$,
(b) a Si content a (parts by mol) meets $0.1 \leq a \leq 4.0$,
(c) a Mn content b (parts by mol) meets $0.1 \leq b \leq 4.0$,
(d) an Al content c (parts by mol) meets $0.01 \leq c \leq 3.0$,
(e) a V content d (parts by mol) meets $0.01 \leq d \leq 0.3$,
(f) a molar ratio w of a total of Sr and Ba to Sr meets $0.60 \leq w \leq 0.95$,
(g) a molar ratio z of a total of Zr and Ti to Zr meets $0.92 \leq z \leq 0.98$, and
the plurality of dielectric ceramic layers each have crystal grains, and the crystal grains are 1.2 μm or less in average grain size.

6. The laminated ceramic capacitor according to claim 5, wherein the perovskite-type compound further contains Ca, and when the total content of Zr and Ti is 100 parts by mol after the laminated body is subjected to dissolution treatment and made into the solution:
the total content of m includes Sr, Ba, and Ca,
the molar ratio w is the total of Sr, Ba, and Ca to Sr,
a molar ratio y of a total of Sr, Ba, and Ca to Ca meets $0 \leq y \leq 0.35$, and
a total of a value of the w and a value of the y meets $0.6 \leq w+y \leq 0.95$.

7. The laminated ceramic capacitor according to claim 5, wherein the crystal grains are 1.0 μm or less in average grain size.

8. The laminated ceramic capacitor according to claim 5, wherein the internal electrodes contain Ni or a Ni alloy.

9. A laminated ceramic capacitor comprising:
a laminated body comprising a plurality of stacked dielectric ceramic layers and a plurality of internal electrodes at interfaces between adjacent dielectric ceramic layers of the plurality of stacked dielectric ceramic layers; and
an external electrode on an outer surface of the laminated body and electrically connected to the internal electrodes,
wherein the dielectric ceramic layers contain:
Si, Mn, Al, V, and a perovskite-type compound containing Sr, Ba, Zr, and Ti,
when a total content of Zr and Ti is 100 parts by mol:
(a) a total content m (parts by mol) of Sr and Ba meets $100 \leq m \leq 105$,
(b) a Si content a (parts by mol) meets $0.1 \leq a \leq 4.0$,
(c) a Mn content b (parts by mol) meets $0.1 \leq b \leq 4.0$,
(d) an Al content c (parts by mol) meets $0.01 \leq c \leq 3.0$,
(e) a V content d (parts by mol) meets $0.01 \leq d \leq 0.3$, (f) a molar ratio w of a total of Sr and Ba to Sr meets $0.60 \leq w \leq 0.95$, (g) a molar ratio z of a total of Zr and Ti to Zr meets $0.92 \leq z \leq 0.98$, and the plurality of dielectric ceramic layers each have crystal grains, and the crystal grains are 1.2 µm or less in average grain size.

10. The laminated ceramic capacitor according to claim 9, wherein the perovskite-type compound further contains Ca, and when the total content of Zr and Ti is 100 parts by mol:
    the total content of m includes Sr, Ba, and Ca,
    the molar ratio w is the total of Sr, Ba, and Ca to Sr,
    a molar ratio y of a total of Sr, Ba, and Ca to Ca meets $0 \leq y \leq 0.35$, and
    a total of a value of the w and a value of the y meets $0.6 \leq w+y \leq 0.95$.

11. The laminated ceramic capacitor according to claim 9, wherein the crystal grains are 1.0 µm or less in average grain size.

12. The laminated ceramic capacitor according to claim 9, wherein the internal electrodes contain Ni or a Ni alloy.

13. A method for manufacturing a laminated ceramic capacitor, the method comprising:
    (1) preparing a ceramic slurry by mixing a Si compound, a Mn compound, an Al compound, a V compound, and a powder including a perovskite-type compound containing Sr, Ba, Zr, and Ti,
    wherein in the ceramic slurry, when a total content of Zr and Ti is 100 parts by mol:
       a) a total content m (parts by mol) of Sr and Ba meets $100 \leq m \leq 105$,
       b) a Si content a (parts by mol) meets $0.1 \leq a \leq 4.0$,
       c) a Mn content b (parts by mol) meets $0.1 \leq b \leq 4.0$,
       d) an Al content c (parts by mol) meets $0.01 \leq c \leq 3.0$,
       e) a V content d (parts by mol) meets $0.01 \leq d \leq 0.3$,
       f) a molar ratio w of a total of Sr and Ba to Sr meets $0.60 \leq w \leq 0.95$, and
       g) a molar ratio z (Zr/(Zr+Ti)) of the total of Zr and Ti to Zr meets $0.92 \leq z \leq 0.98$;
    (2) forming the ceramic slurry into a sheet shape to obtain ceramic green sheets;
    (3) stacking the ceramic green sheets and conductor patterns to form an unfired laminated body; and
    (4) firing the unfired laminated body to obtain a laminated body that has a structure with internal electrodes provided at interfaces between adjacent dielectric ceramic layers of a plurality of stacked dielectric ceramic layers, and has crystal grains of 1.2 µm or less in average grain size included in the dielectric ceramic layers.

14. The method for manufacturing a laminated ceramic capacitor according to claim 13, wherein the perovskite-type compound further contains Ca, and when the total content of Zr and Ti is 100 parts by mol:
    the total content m includes Sr, Ba, and Ca,
    the molar ratio w is the total of Sr, Ba, and Ca to Sr,
    a molar ratio y of a total of Sr, Ba, and Ca to Ca meets $0 \leq y \leq 0.35$, and
    a total of a value of the w and a value of the y meets $0.6 \leq w+y \leq 0.95$.

15. The method for manufacturing a laminated ceramic capacitor according to claim 13, wherein the powder is a powder prepared by calcining and loosening a material containing a Sr compound, a Ba compound, a Ti compound, and a Zr compound, and that has a (202) diffraction peak obtained by powder X-ray diffraction with an integral width of 0.4° or less.

16. The method for manufacturing a laminated ceramic capacitor according to claim 15, wherein the integral width is 0.3° or less.

17. A method for manufacturing a laminated ceramic capacitor, the method comprising:
    (1) preparing a mixture by weighing and mixing a Si compound, a Mn compound, an Al compound, a V compound, and a powder including a perovskite-type compound containing Sr, Ba, Zr, and Ti, and making the mixture into slurry,
    wherein in the mixture, when a total content of Zr and Ti is 100 parts by mol,
       a) a total content m (parts by mol) of Sr and Ba meets $100 \leq m \leq 105$,
       b) a Si content a (parts by mol) meets $0.1 \leq a \leq 4.0$,
       c) a Mn content b (parts by mol) meets $0.1 \leq b \leq 4.0$,
       d) an Al content c (parts by mol) meets $0.01 \leq c \leq 3.0$,
       e) a V content d (parts by mol) meets $0.01 \leq d \leq 0.3$,
       f) a molar ratio w of a total of Sr and Ba to Sr meets $0.60 \leq w \leq 0.95$, and
       g) a molar ratio z (Zr/(Zr+Ti)) of the total of Zr and Ti to Zr meets $0.92 \leq z \leq 0.98$;
    (2) forming the slurry into a sheet shape to obtain ceramic green sheets;
    (3) stacking the ceramic green sheets and conductor patterns to form an unfired laminated body; and
    (4) firing the unfired laminated body to obtain a laminated body that has a structure with internal electrodes provided at interfaces between adjacent dielectric ceramic layers of a plurality of stacked dielectric ceramic layers, and has crystal grains of 1.2 µm or less in average grain size included in the dielectric ceramic layers.

18. The method for manufacturing a laminated ceramic capacitor according to claim 17, wherein the perovskite-type compound further contains Ca, and when a total content of Zr and Ti is 100 parts by mol,
    the total content m includes Sr, Ba, and Ca,
    the molar ratio w is the total of Sr, Ba, and Ca to Sr,
    a molar ratio y of a total of Sr, Ba, and Ca to Ca meets $0 \leq y \leq 0.35$, and
    a total of a value of the w and a value of the y meets $0.6 \leq w+y \leq 0.95$.

19. The method for manufacturing a laminated ceramic capacitor according to claim 17, wherein the powder is a powder prepared by calcining and loosening a material containing a Sr compound, a Ba compound, a Ti compound, and a Zr compound, and that has a (202) diffraction peak obtained by powder X-ray diffraction with an integral width of 0.4° or less.

20. The method for manufacturing a laminated ceramic capacitor according to claim 19, wherein the integral width is 0.3° or less.

* * * * *